United States Patent
Li et al.

(10) Patent No.: US 8,032,923 B1
(45) Date of Patent: Oct. 4, 2011

(54) CACHE TECHNIQUES FOR URL RATING

(75) Inventors: Jianda Li, San Jose, CA (US); Yong Yew Chan, San Mateo, CA (US)

(73) Assignee: Trend Micro Incorporated, Tokyo (JP)

( * ) Notice: Subject to any disclaimer, the term of this patent is extended or adjusted under 35 U.S.C. 154(b) by 1011 days.

(21) Appl. No.: 11/772,106

(22) Filed: Jun. 29, 2007

Related U.S. Application Data

(60) Provisional application No. 60/806,319, filed on Jun. 30, 2006.

(51) Int. Cl.
*G06F 15/173* (2006.01)
*G06F 12/00* (2006.01)
*G06F 7/00* (2006.01)
*H04W 4/00* (2009.01)

(52) U.S. Cl. ............... 726/2; 726/1; 711/108; 709/223; 709/224; 709/227; 709/238; 370/235; 370/238; 370/229

(58) Field of Classification Search .............. 726/2
See application file for complete search history.

(56) References Cited

U.S. PATENT DOCUMENTS

| | | | |
|---|---|---|---|
| 6,351,767 B1 * | 2/2002 | Batchelder et al. ........... | 709/219 |
| 7,506,055 B2 * | 3/2009 | McClain et al. .............. | 709/225 |
| 2002/0092012 A1 * | 7/2002 | Shah .............................. | 717/170 |
| 2002/0107935 A1 | 8/2002 | Lowery et al. | |
| 2005/0154837 A1 | 7/2005 | Keohane et al. | |
| 2006/0064469 A1 * | 3/2006 | Balasubrahmaniyan et al. ............................ | 709/218 |
| 2007/0107935 A1 | 5/2007 | Hash et al. | |
| 2007/0204040 A1 | 8/2007 | Cox | |
| 2007/0260748 A1 * | 11/2007 | Talkington .................... | 709/246 |
| 2008/0168229 A1 | 7/2008 | Beelen et al. | |

OTHER PUBLICATIONS

Broder, A.Z., et al, 'Efficient URL Caching for World Wide Web Crawling', May 20-24, 2003, WWW2003, entire document, http://research.microsoft.com/pubs/65157/p96-broder.pdf.*
Wang, J., 'A Survey of Web Caching Schemes for the Internet', Oct. 1999, Dept. of Computer Science, Cornell Univ., entire document, http://ccr.sigcomm.org/archive/1999/oct99/Jia_Wang2.pdf.*
"U.S. Appl. No. 11/781,206", filed Jul. 20, 2007.
"Non Final Office Action", U.S. Appl. No. 11/781,206, Mailing Date: Jun. 25, 2009.
"Final Office Action", U.S. Appl. No. 11/781,206, Mailing Date: Dec. 1, 2009.
"Advisory Action", U.S. Appl. No. 11/781,206, Mailing Date: Feb. 5, 2010.
"Examiner's Answer to Appeal Brief", U.S. Appl. No. 11/781,206, Mailing Date: Sep. 30, 2010.

* cited by examiner

*Primary Examiner* — Edan Orgad
*Assistant Examiner* — Ronald Baum
(74) *Attorney, Agent, or Firm* — IP Strategy Group, P.C.

(57) ABSTRACT

A computer-implemented method for implementing URL (Uniform Resource Locator) filtering is disclosed. The method includes receiving an access request for a webpage from a client, the access request being transmitted from a gateway device via a computer network and including at least a portion of a URL for the webpage. The method also includes ascertaining a rating for the at least the webpage. The method additionally includes providing a response to the gateway device via the computer network, the response including the rating and at least a cache hint that includes at least directory block caching for caching in a directory block of a local cache, domain block caching for caching in a domain block of the local cache, and do-not-cache for not caching in the local cache.

17 Claims, 5 Drawing Sheets

CACHE TECHNIQUES FOR URL RATING

PRIORITY CLAIM

This application claims priority under 35 USC 119(e) to a commonly owned provisional application entitled "CACHE METHODS FOR URL RATING" filed by the same inventors herein on Jun. 30, 2006 (Application No. 60/806,319) which is incorporated by reference herein.

BACKGROUND OF THE INVENTION

Given malicious websites and inappropriate and unwanted contents on the Internet, URL filtering is important for safe and efficient use of the Internet. URL filtering may be based on URL rating, which typically involves a rating server receiving URLs from clients and providing ratings (or categories) of the URLs for clients.

FIG. 1A shows a simplified block diagram of a typical URL rating scheme. As shown in FIG. 1A, client 102 sends a URL in a rating request to rating server 104 through the Internet, and in return rating server 104 sends a rating to client 102 in real time or near real time. In some cases, a URL may include multiple contents (such as presented in frames) and require multiple ratings. Given the popularity of Internet usage, if a rating request were serviced by rating server 104 whenever client 102 wishes to access a webpage, the number of rating requests serviced on a given day may be quite large, necessitating large communication and processing bandwidth on the part of rating server 104 (or multiple servers, as may be the case).

In order to reduce the number of rating requests sent through the network and processed by rating server 104, client 102 may employ a local cache 106 for temporarily storing complete URLs (or their hash values) of previously accessed web pages, along with their corresponding ratings. Thus, if a web page has been rated once by rating server 104, a subsequent access request by client 102 would result in a local cache hit, negating the need to send the URL to rating server 104 again to obtain a rating.

FIG. 1B shows a schematic representation of local cache 106. As shown in FIG. 1B, local cache 106 stores an exemplary URL "http://www.springfieldgazzette.com/articles/20060502.html." with its corresponding rating "News". There may be many more URLs and corresponding ratings stored in cache 106, of which the previously exemplary URL is only representative. For the cache to be useful in substantially reducing the number of rating requests sent through the network, a sizable cache that stores a sufficiently large number of frequently accessed URLs is desirable. This is because a cache hit requires that the URL and corresponding rating of the desired web page be locally cached. Such an arrangement, however, tends to result in an unduly high storage capacity requirement and inefficient use of the data storage device of client 102.

On the rating server side, techniques are also applied to rating server 104 to reduce the storage and processing requirements for servicing URLs sent by clients. For example, instead of processing the full URL (e.g., "http://www.springfieldgazzette.com/articles/20060502.html") when received, server 104 may employ domain-based rating or directory-based rating in servicing the rating request.

FIG. 1C shows an illustrative example of prior art domain-based rating. As shown in FIG. 1C, rating server 104 processes only the domain portion of the full URL (e.g., only the "http://www.springfieldgazzette.com" portion of the full URL "http://www.springfieldgazzette.com/articles/20060502.html") and provides the rating "news" to client 102. Domain-based rating is employed if it is known (or decided or designated) by rating server 104 that all contents of the domain "springfieldgazzette.com" are related to news, and the "news" rating can be applied to all URLs that associated with that domain. However, domain-based rating compromises the accuracy of rating, since there might be exceptions (e.g., categories or ratings other than "news") or even malicious contents (such as phishing contents) in web pages of a given domain.

Directory-based rating provides more granular rating than domain-based rating. With directory-based rating, rating server 104 processes a URL not only by its domain, but also up to its longest directory path (or to a desired directory level in the directory level tree). The rating is then applied to all sub-directories or files under that directory. FIGS. 1D and 1E show illustrative examples of prior art directory rating. In FIG. 1D, a full URL "http://www.lagazzette.com/articles/Julyrainfall.html" is processed only up to its directory portion (e.g., only the portion "http://www.lagazzette.com/articles/") to derive a rating of "news," In other words, URLs accessing files and sub-directories under "http://www.lagazzette.com/articles/" are given a rating of "news". As another example, in FIG. 1E, a full URL "http://www.lagazzette.com/crossword/July122006.html" is processed only up to its directory portion (e.g., only the portion "http://www.lagazzette.com/crossword/") to derive a rating of "entertainment." in other words, URLs accessing files and sub-directories under "http://www.lagazzette.com/crossword/" are given a rating of "entertainment". However, the higher accuracy of directory rating conies at the cost of higher storage capacity and processing power on the part of rating server 104.

In light of the above, there is a need in the art for a method or apparatus that provides URL rating without comprising efficient use of network bandwidth, data storage, and processing power.

SUMMARY OF THE INVENTION

The invention relates, in an embodiment, to a computer-implemented method for implementing URL (Uniform Resource Locator) filtering on behalf of a client. The method includes receiving an access request for a webpage from the client, the access request including a URL for the webpage and ascertaining whether a domain portion of the URL is cached in a domain cache block of a first cache. The method further includes ascertaining, if the domain portion of the URL is not cached in the domain cache block of the first cache, whether a directory portion of the URL is cached in a directory cache block of the first cache. The method also includes employing, if the domain portion of the URL is cached in the domain cache block of the first cache or the directory portion of the URL is cached in the directory cache block of the first cache, a first rating that is cached in the first cache to respond to service the access request. The method additionally includes forwarding, if neither the domain portion of the URL is cached in the domain cache block of the first cache nor the directory portion of the URL, is cached in the directory cache block of the first cache, at least a portion of the URL to a URL filtering server to receive a second rating therefor to service the access request, wherein the first cache responds to the client more rapidly than the URL filtering server responds to the client.

In another embodiment, the invention relates to a computer-implemented method for implementing URL (Uniform Resource Locator) filtering. The method includes receiving an access request for a webpage from a client, the access request being transmitted from a gateway device via a computer network and including at least a portion of a URL for the webpage. The method also includes ascertaining a rating for the at least the webpage. The method additionally includes providing a response to the gateway device via the computer network, the response including the rating and at least a cache hint that includes at least directory block caching and domain block caching, wherein the directory block caching signifying that the rating be locally cached in connection with an entry in a directory cache block of a local cache, the domain block caching signifying that the rating be locally cached in connection with an entry in a domain cache block of the local cache.

In yet another embodiment, the invention relates to a computer-implemented method for implementing URL (Uniform Resource Locator) filtering that includes receiving an access request for a webpage from a client, the access request being transmitted from a gateway device via a computer network and including at least a portion of a URL for the webpage. The method also includes ascertaining a rating for the at least the webpage. The method additionally includes providing a response to the gateway device via the computer network, the response including the rating and at least a cache hint that includes at least do-not-cache, the do-not-cache signifies that the rating be not cached in a local cache.

The above summary relates to only one of the many embodiments of the invention disclosed herein and is not intended to limit the scope of the invention, which is set forth in the claims herein. These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF VARIOUS EMBODIMENTS

The present invention will now be described in detail with reference to a few embodiments thereof as illustrated in the accompanying drawings, in the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

Figures 1A, 1B:
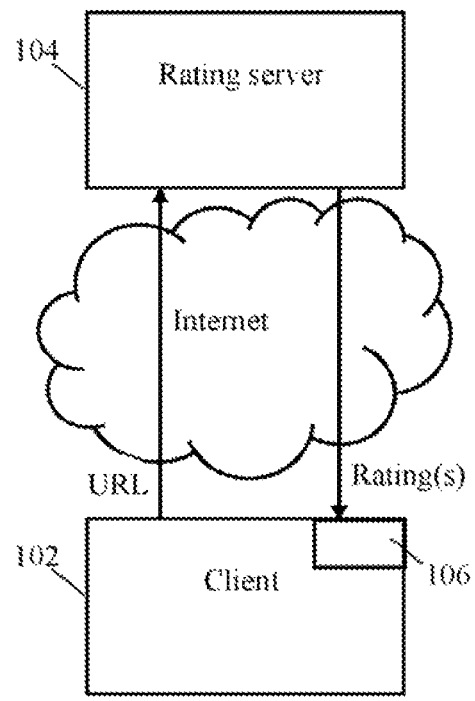
FIG. 1A shows a block, diagram of a prior art URL rating scheme.
FIG. 1B shows a schematic representation of a prior art local cache.
Figure 1C:
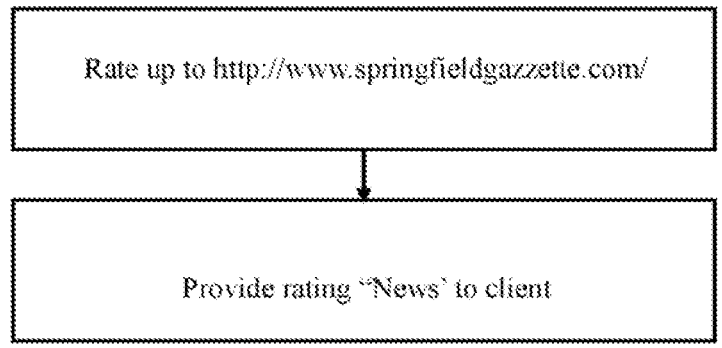
FIG. 1C shows an illustrative example of prior art domain-based rating.
Figure 1D:
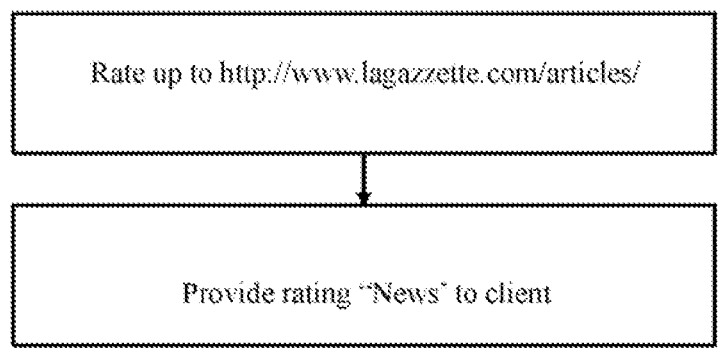
FIGS. 1D and 1E show illustrative examples of prior art directory-based rating.
Figure 1E:
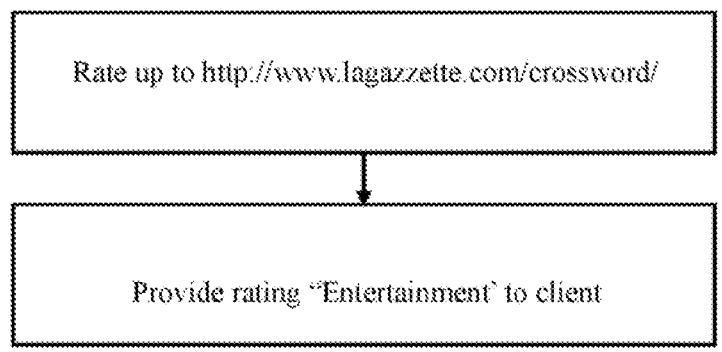
Figures 2A, 2B:
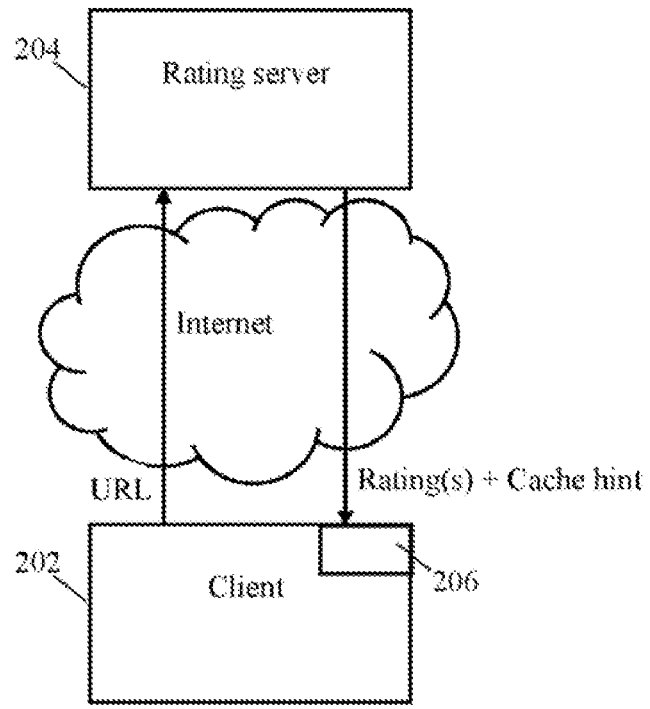
FIG. 2A shows a block diagram of a URL rating scheme implemented in accordance with one or more embodiments of the present invention.
FIG. 2B shows a schematic representation of a local cache implemented in accordance with one or more embodiments of the present invention.
Figure 3:
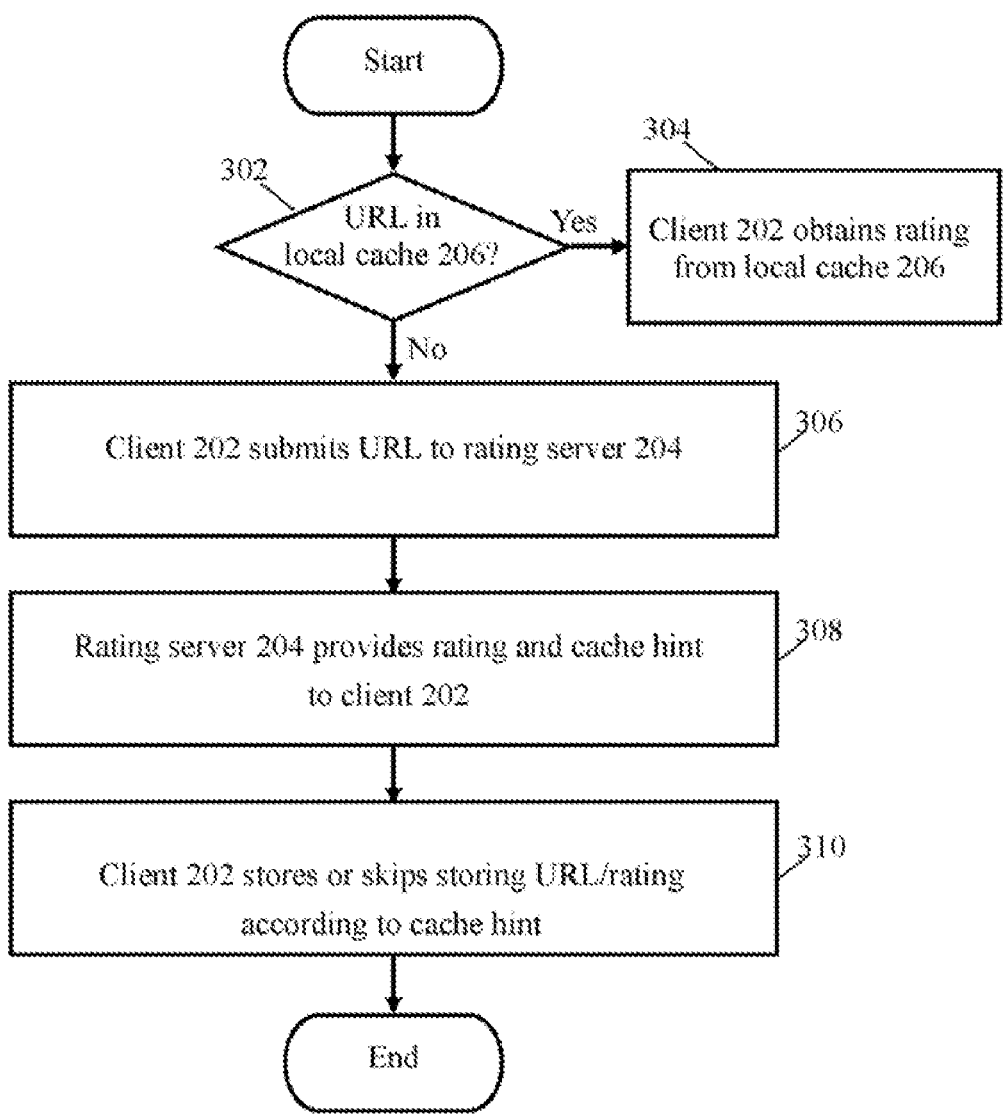
FIG. 3 shows a flow chart of a rating method implemented in accordance with one or more embodiments of the present invention.

As shown in FIG. 3, the caching method starts with step 302, at which client 202 (shown in FIG. 2A) determines whether a URL is stored in a local cache 206 (shown in FIG. 2A) when a user visits a website.

Referring now to FIG. 2B, local cache 206 includes domain block 212 and directory block 214. Domain block 212 is configured to store hash values of domain strings of the URLs (or the domain strings themselves or other representations thereof) and their corresponding ratings. A domain string may be, for example and without limitation, "http://www.springfieldgazette.com/", and its corresponding rating may be, for example and without limitation, "news" as illustrated in FIG. 2B.

Further, directory block 214 is configured to store hash values of directory strings of URLs (or the directory strings themselves or other representations thereof) and their corresponding ratings The directories may, for example, be "http://www.lagazzette.com/articles/" and "http://www.lagazzette.com/crossword/", and their corresponding ratings may be, for example and without limitation, "news" and "entertainment", respectively, as illustrated in FIG. 2B.

If the URL is stored in local cache 206 (as determined in step 302), then control is transferred to step 304, at which client 202 obtains a rating of the URL from local cache 206. Step 304 is explored further in a subsequent FIG. 4 herein. If the URL is not stored in local cache 206, control is transferred to step 306.

At step 306, client 202 submits the URL to rating server 204 (shown in FIG. 2A). The submission may be made directly by the client, or may be performed via a gateway device, for example. Then, control is transferred to step 308.

At step 308, rating server 204 provides a rating and a cache hint to client 202. In accordance with one or more embodiments of the present invention, the cache hint includes one of the three instructions: (a) do not cache; (h) cache in domain block; and (c) cache in directory block. The "do not cache" cache hint may be omitted in some embodiments. Then, control is transferred to step 310.

At step 310, client 202 stores or skips storing the rating and a hash value of the URL according to the cache hint. If the cache hint instructs "do not cache", then client 202 will store neither the rating nor any hash value, if the cache hint, instructs "cache in domain block", then client 202 stores the rating and the hash value of the domain string of the URL (or the domain string of the URL itself) into domain block 212 (shown in FIG. 2B). If the cache hint instructs "cache in directory block", then client 202 stores the rating and the hash value of a directory string of the URL (or the directory string itself) into directory block 214 (shown in FIG. 2R). In accordance with one or more embodiments of the present invention (but is not a limitation or absolute requirement of the invention), the directory string represents the longest directory path of the URL.

In accordance with one or more embodiments of the present invention, the cache method includes a "time-out" condition such that periodically or a period of nine after a domain string or directory string (or representation thereof) and its associated rating are stored in cache 206, the domain string or directory string (or representation thereof) and the associated rating expire (i.e., removed from the cache). The removal after expiration gives the rating server an opportunity to refresh or update the rating or the cache hint associated with a given URL. Thus, if the rating associated with a URL changes after being cached, for example, the rating may be updated after expiration at the client from the rating server when the client next attempts to employ that URL to access a web page associated that URL.

As discussed, an optional cache hint is "do not cache." This cache hint is employed in situation where the rating server does not wish for the local clients to cache the URL (whether domain-based or directory-based) and the associated rating. For example, if a URL forwarded by the client points to a malicious file, then the cache hint will instruct "do not cache" for that URL, thereby resulting in the non-caching, of the domain string and/or the directory string associated with that URL at the local cache. For illustrative example and without limitation, if the URL has the domain string "http://www.springfieldgazzette.com/" (shown in FIG. 28) but the full URL points to a malicious file so that the full URL may read, for example and without limitation, "http://www.springfield-gazzette.com/articles/hacked/fakecitibank-log.html", rating server 204 may instruct the local cache to not cache URLs associated with the domain and/or associated with the directory. In this manner, the rating server retains control over rating of URLs associated with domains and/or directories.

Figure 4:
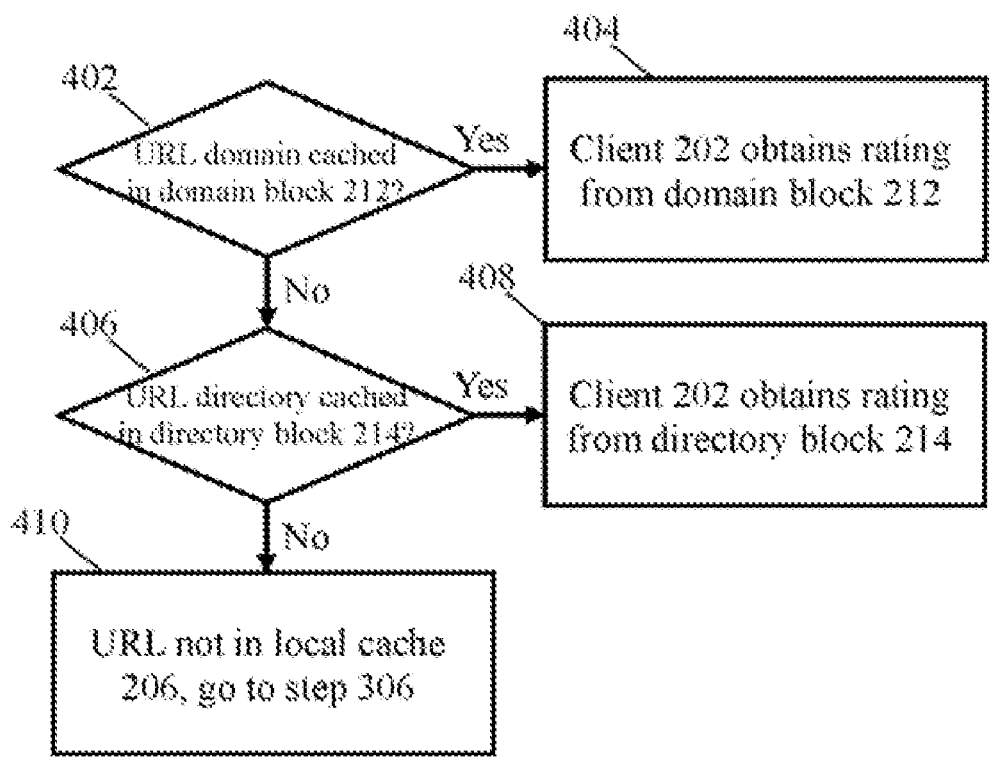
FIG. 4 shows details of a decision step of the rating, method shown in FIG. 3.

FIG. 4 shows, in greater detail and in accordance with an embodiment, steps 302 and 304 of FIG. 3. At step 402, client 202 determines whether the hash value of the domain string of the URL (or the domain string of the URL itself) is cached in domain block 212 (shown in FIG. 2B). If cached, then control is transferred to step 404, at which client 202 obtains a rating of the URL from domain block 212

If the hash value of the domain of the URL (or the domain string of the URL itself) is not cached in domain block 212, then control is transferred to step 406, at which client 202 determines whether the hash value of the directory string of the URL (or the directory string of the URL itself) is cached in directory block 214 (shown in FIG. 2). If cached, then control is transferred to step 408, at which client 202 obtains a rating of the URL from directory block 214.

If the hash value of the directory string of the URL (or the directory string of the URL itself is not cached in directory block 214, then control is transferred to step 410, at which control is transferred to step 306 shown in FIG. 3.

The inventors herein believe that by ascertaining whether a URL is in the domain-based caching block of the local cache before checking the directory-based caching block, substantial performance advantage is achieved. This is because the inventors have discovered that in typical usage scenarios, a large percentage of the URLs are cached at the domain level. By checking the URL against the domain-based caching block first, the chance is fairly high that a cache bit would occur even before checking the URL, against the directory-based caching block. It should be realized, however, that it is also possible, in some embodiments, to check the URL against the directory-based caching block before the domain-based caching block.

Advantages of one or more embodiments of the present invention are believed to include: (a) efficient use of network bandwidth; (h) improved data processing efficiency for URL rating service providers; (c) reduced data processing and storage equipment costs for URL rating service providers; (d) reduced data storage cost for Internet users; and (e) fast URL rating and/or fast website access for Internet users.

While this invention has been described in terms of several preferred embodiments, there are alterations, permutations, and equivalents, which fall within the scope of this invention Also, the title, summary, and abstract are provided herein for convenience and should not be used to construe the scope of the claims herein. It should also be noted that there are many alternative ways of implementing the methods and apparatuses of the present invention. Although various examples are provided herein, it is intended that these examples be illustrative and not limiting with respect to the invention. Further, in this application, a set of "n" items refers zero or more items in the set. It is therefore intended that the following appended claims be interpreted as including all such alterations, permutations, and equivalents as fall within the true spirit and scope of the present invention.

What is claimed is:

1. A computer-implemented method for implementing URL (Uniform Resource Locator) filtering on behalf of a client, said computer-implemented method comprising: receiving an access request for a webpage from said client, said access request including a URL for said webpage; determining whether a domain portion of said URL is cached in a domain cache block of a first cache, said first cache including at least said domain cache block and a directory cache block that is different from and other than said domain cache block, said domain cache block storing at least representations of domain portions of a first set of URLs and ratings corresponding to said domain portions of said first set of URLs, said directory cache block storing at least representations of directory portions of a second set of URLs and ratings corresponding to said directory portions of said second set of URLs, said directory portions of said second set of URLs including at least directory paths; whereas the first set of URLs is different from the second set of URLs; after said determining, if said domain portion of said URL is not cached in said domain cache block of said first cache, ascertaining whether a directory portion of said URL is cached in said directory cache block of said first cache, wherein said directory portion of said URL includes at least a directory path; after said ascertaining, if said domain portion of said URL is cached in said domain cache block of said first cache or said directory portion of said URL is cached in said directory cache block of said first cache; employing a first rating that is cached in said first cache to respond to service said access request; and after said ascertaining, if neither said domain portion of said URL is cached in said domain cache block of said first cache nor said directory portion of said URL is cached in said directory cache block of said first cache, forwarding at least a portion of said URL to a URL filtering server to request a second rating to service said access request, wherein said first cache responds to said client more rapidly than said URL filtering server responds to said client.

2. The computer-implemented method of claim 1 wherein said URL filtering server is accessible to said client via the Internet.

3. The computer-implemented method of claim 1 wherein said domain cache block of said first cache stores hash values of URL domain portions of URLs.

4. The computer-implemented method of claim 1 wherein said directory cache block of said first cache stores hash values of URL directory portions of URLs.

5. The computer-implemented method of claim 1 further comprising:
receiving a cache hint associated with said second rating, said cache hint including at least directory block caching and domain block caching, wherein said domain portion of said URL is cached in said domain cache block of said first cache if said cache hint is said domain block caching, said directory portion of said URL is cached in said directory cache block of said first cache if said cache hint is said directory block caching.

6. The computer-implemented method of claim 5 wherein said cache hint includes a do-not-cache, wherein said URL is not cached in said first cache if said cache hint is said do-not-cache.

7. A computer-implemented method for implementing URL (Uniform Resource Locator) filtering on behalf of a client, said computer-implemented method comprising: receiving an access request for a webpage from said client, said access request including a URL for said webpage; ascertaining whether a directory portion of said URL is cached in a directory cache block of a first cache, said first cache including at least said directory cache block and a domain cache block that is different from and other than said directory cache block, said domain cache block storing at least representations of domain portions of a first set of URLs and ratings corresponding to said domain portions of said first set of URLs, said directory cache block storing at least representations of directory portions of a second set of URLs and ratings corresponding to said directory portions of said second set of URLs, said directory portions of said second set of URLs including at least directory paths, whereas the first set of URLs is different from the second set of URLs, wherein said directory portion of said URL includes at least a directory path; after said ascertaining, if said directory portion of said URL is not cached in said directory cache block of said first cache, ascertaining whether a domain portion of said URL is cached in said domain cache block of said first cache; and after said determining, if said domain portion of said URL is cached in said domain cache block of said first cache or said directory portion of said URL is cached in said directory cache block of said first cache, employing a first rating that is cached in said first cache to respond to service said access request; and after said determining, if neither said domain portion of said URL is cached in said domain cache block of said first cache nor said directory portion of said URL is cached in said directory cache block of said first cache, forwarding at least a portion of said URL to a URL filtering server to request a second rating to service said access request, wherein said first cache responds to said client more rapidly than said URL filtering server responds to said client.

8. The computer-implemented method of claim 7 wherein said URL filtering server is accessible to said client via the Internet.

9. The computer-implemented method of claim 7 wherein said domain cache block of said first cache stores hash values of URL domain portions of URLs.

10. The computer-implemented method of claim 7 wherein said directory cache block of said first cache stores hash values of URL directory portions of URLs.

11. The computer-implemented method of claim 7 further comprising:
receiving a cache hint associated with said second rating, said cache hint including at least directory block caching and domain block caching, wherein said domain portion of said URL is cached in said domain cache block of said first cache if said cache hint is said domain block caching, said directory portion of said URL is cached in said directory cache block of said first cache if said cache hint is said directory block caching.

12. The computer-implemented method of claim 11 wherein said cache hint includes a do-not-cache, wherein said URL is not cached in said first cache if said cache hint is said do-not-cache.

13. A computer-implemented method for implementing URL (Uniform Resource Locator) filtering, said computer-implemented method comprising: receiving an access request for a webpage from a client, said access request being transmitted from a gateway device via a computer network and including at least a portion of a URL for said webpage; ascertaining a rating for said at least said webpage; providing a response to said gateway device via said computer network, said response including said rating and at least a cache hint that includes at least directory block caching and domain block caching, wherein said directory block caching instructs that said rating be locally cached in connection with an entry in a directory cache block of a local cache, said entry in said directory cache block including at least a directory path, said directory cache block of said local cache storing at least representations of directory portions of a first set of URLs and ratings corresponding to said directory portions of said first set of URLs, said directory portions of said first set of URLs including at least directory paths, and wherein said domain block caching instructs that said rating be locally cached in connection with an entry in a domain cache block of said local cache, said domain cache block of said local cache being different from and other than said directory cache block of said local cache, said domain cache block of said local cache storing at least representations of domain portions of a second set of URLs and ratings corresponding to said domain portions of said second set of URLs; whereas the first set of URLs is different from the second set of URLs.

14. The computer-implemented method of claim 13 wherein said cache hint includes a do-not-cache, said do-not-cache signifies that said rating be not cached in said local cache.

15. The computer-implemented method of claim 13 wherein said computer network is the Internet.

16. The computer-implemented method of claim 13 wherein said domain cache block of said first cache stores hash values of URL domain portions of URLs.

17. The computer-implemented method of claim 13 wherein said directory cache block of said first cache stores hash values of URL directory portions of URLs.

* * * * *

UNITED STATES PATENT AND TRADEMARK OFFICE
CERTIFICATE OF CORRECTION

| | | |
|---|---|---|
| PATENT NO. | : 8,032,923 B1 | Page 1 of 1 |
| APPLICATION NO. | : 11/772106 | |
| DATED | : October 4, 2011 | |
| INVENTOR(S) | : Jianda Li and Kong Yew Chan | |

It is certified that error appears in the above-identified patent and that said Letters Patent is hereby corrected as shown below:

Title page, item [75] Inventor: Chan, Yong Yew is incorrect. The second named inventor should read: Chan, Kong Yew Signed and Sealed this
Fifteenth Day of November, 2011

David J. Kappos
*Director of the United States Patent and Trademark Office*